US012780011B2

(12) United States Patent
Kulsangcharoen et al.

(10) Patent No.: US 12,780,011 B2
(45) Date of Patent: Nov. 3, 2026

(54) CONTROLLER

(71) Applicant: Hamilton Sundstrand Corporation, Charlotte, NC (US)

(72) Inventors: Ponggorn Kulsangcharoen, Solihull (GB); Andrei Dinu, Leicester (GB); Ali Khalid Al-Karaghouli, Solihull (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 132 days.

(21) Appl. No.: 18/791,104

(22) Filed: Jul. 31, 2024

(65) Prior Publication Data

US 2025/0050747 A1 Feb. 13, 2025

(30) Foreign Application Priority Data

Aug. 7, 2023 (EP) .................................... 23190090

(51) Int. Cl.
*B60L 15/22* (2006.01)
*B60L 3/12* (2006.01)

(52) U.S. Cl.
CPC ................. *B60L 15/22* (2013.01); *B60L 3/12* (2013.01); *B60L 2200/10* (2013.01)

(58) Field of Classification Search
CPC ........ B60L 15/22; B60L 3/12; B60L 2200/10; H02J 13/34; H02J 2105/32; H02J 2105/51; H02J 1/084; H02J 1/106; H02J 3/007
USPC ........................................................... 701/22
See application file for complete search history.

(56) References Cited

U.S. PATENT DOCUMENTS

| | | | | |
|---|---|---|---|---|
| 6,281,645 | B1 | 8/2001 | Matsukawa | |
| 8,536,821 | B2 | 9/2013 | Kamenetz et al. | |
| 8,878,542 | B2 * | 11/2014 | Bruckhaus | B60L 3/04 324/500 |
| 8,935,011 | B2 * | 1/2015 | Tischer | H02J 3/14 700/297 |
| 2018/0138716 | A1 * | 5/2018 | Bailey | B64D 47/00 |
| 2018/0358910 | A1 * | 12/2018 | Mayr | H02P 27/08 |
| 2020/0295660 | A1 * | 9/2020 | Oguma | H02M 3/1584 |
| 2021/0159831 | A1 * | 5/2021 | Kallio | H02P 23/14 |

(Continued)

FOREIGN PATENT DOCUMENTS

| | | | |
|---|---|---|---|
| CN | 208112534 | U | 11/2018 |
| EP | 1482618 | A1 | 12/2004 |
| GB | 2544097 | * | 5/2017 |

OTHER PUBLICATIONS

Extended European Search Report dated Feb. 15, 2024 in connection with European Patent Application No. 23190090.3, 8 pages.

*Primary Examiner* — Muhammad Shafi

(57) ABSTRACT

A controller for an electrical drive system includes one or more electrical drives, one or more electrical loads, and a switching component configured to connect the one or more electrical drives to the one or more electrical loads in a switching configuration. The controller includes a processing module configured to receive switching data indicative of the switching configuration and analyze the switching data to determine control data for at least one of the electrical drives. The controller further includes an output module configured to output the control data to the at least one electrical drive. The at least one electrical drive is configured to use the control data to supply the electrical load/s, via the switching component, with electrical power.

20 Claims, 1 Drawing Sheet

(56) References Cited

U.S. PATENT DOCUMENTS

| | | | | |
|---|---|---|---|---|
| 2022/0021323 | A1* | 1/2022 | Hogan ...................... | H02J 3/46 |
| 2022/0302861 | A1 | 9/2022 | Hogan et al. | |
| 2024/0039290 | A1* | 2/2024 | Handelsman ........... | H02J 3/007 |

* cited by examiner

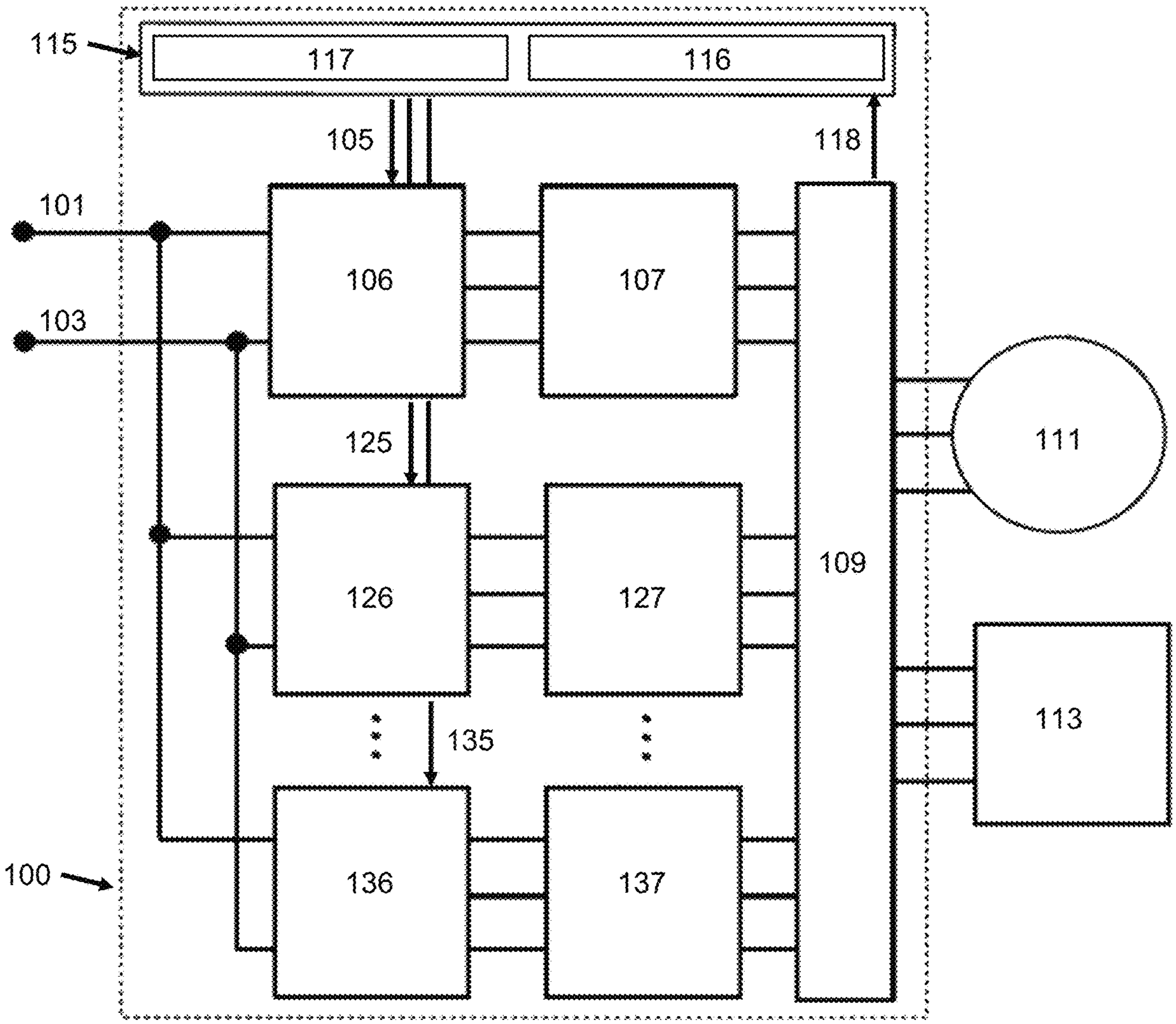
115
117
116
105
118
101
103
106
107
125
111
126
127
109
135
113
100
136
137

CONTROLLER

CROSS-REFERENCE TO RELATED APPLICATION AND PRIORITY CLAIM

This application claims priority under 35 U.S.C. § 119 to European Patent Application No. 23190090.3 filed on Aug. 7, 2023, which is hereby incorporated by reference in its entirety.

FIELD OF THE INVENTION

The invention relates to a controller, an electrical drive system, and a method for controlling an electrical drive system.

BACKGROUND

An electrical drive system may include an architecture in which a supervisory controller configures a number of electrical drives to supply electrical power to multiple loads through a switch matrix, depending on the demand of the loads. In conventional multi-channel drive systems, the supervisory controller sends a set point demand to each electrical drive. The control loop to achieve the demanded set point is implemented locally within each drive based on default parameters. The control performance of such a system may be reduced where the numbers and types of loads and drives vary depending on operating conditions.

SUMMARY

In a first aspect of the invention there is provided a controller for an electrical drive system, the electrical drive system comprising one or more electrical drives, one or more electrical loads, and a switching component configured to connect the one or more electrical drives to the one or more electrical loads in a switching configuration. The controller comprises a processing module configured to receive switching data indicative of the switching configuration, and analyze the switching data to determine control data for at least one of the electrical drives. The controller further comprises an output module configured to output the control data to the at least one electrical drive. The at least one electrical drive is configured to use the control data to supply the electrical load/s, via the switching component, with electrical power.

In an electrical drive system, any change in the load or the electrical drives may cause the transfer function of the control plant associated with the load to change. By analyzing the switching data to determine control data for the electrical drives, each electrical drive can advantageously be configured, by the control data, to implement a set of control parameters that increase the control performance (for example the gain margin, phase margin, control bandwidth, overshoot to a step change of the input, etc.) for the specific load or drive arrangement. As a result, the overall efficiency of the electrical drive system can be improved.

In response to a change in the switching configuration, the processing module may be further configured to analyze the switching data to determine updated control data for at least one of the electrical drives; and the output module is configured to output the updated control data to the at least one of the electrical drives.

A first number of electrical drives may be connected to a first number of electrical loads in the switching configuration, and a different number of electrical drives may be connected to a different number of electrical loads in the updated switching configuration, such that the switching data is indicative of a change in a number of the electrical loads and/or the electrical drives.

The switching data may be further indicative of a change in an electrical characteristic of the electrical loads and/or the electrical drives.

The change in the electrical characteristic may include a change in a level of power output from the electrical drives.

The change in the electrical characteristic may include a change in an inductance of the electrical loads.

The change in the electrical characteristic may include a change in a resistance of the electrical loads.

When the electrical drive system comprises a plurality of electrical drives; the processing module may be further configured to analyze the switching data to determine individual control data for each of the electrical drives; and the output module may be further configured to output the individual control data to each the electrical drives. By providing individual control data to each electrical drive, each electrical drive can operate in a more efficient manner.

In response to the change in the switching configuration, the processing module may be further configured to analyze the switching data to determine updated individual control data; and the output module may be further configured to output the updated individual control data to each of the electrical drives.

The control data and/or updated control data may comprise a set of control parameters. By supplying the electrical drives with control parameters, the electrical drives can be simplified as the required capacity for local information storage in the electrical drives is reduced if all control parameters for all possible system configurations are not stored locally in each drive. However, this may increase the necessary communication bandwidth between the supervisory controller and each electrical drive.

The control data and/or updated control data may comprise instructions to the electrical drive to use a set of control parameters that are stored locally in the electrical drive. By supplying the electrical drives with instructions to use control parameters that are stored locally, the data transferred between the controller and the electrical drives is less, compared to directly sending the control parameters. This advantageously reduces bandwidth requirements between the controller and the electrical drives.

The control data and/or updated control data may comprise control parameters and instructions to the electrical drive to use control parameters that are stored locally in the electrical drive. In some cases, it may be beneficial to send control parameters and instructions, in order to achieve an optimal balance between bandwidth requirements and local storage requirements in the electrical drive.

The control parameters may be a set of proportional, integral and/or derivative data values for use by the electrical drive in supplying electrical power to the loads.

The control data may be a set of proportional, integral and/or derivative data values for use by the electrical drive in supplying electrical power to the loads.

The control data may be different from the updated control data.

In a second aspect of the invention there is provided an electrical drive system for an aircraft, the electrical drive system comprising one or more electrical drives; one or more electrical loads; a switching component configured to connect the one or more electrical drives to the one or more electrical loads in a switching configuration; and the controller of the first aspect configured to output the control data to at least one electrical drive. The at least one electrical drive is configured to use the control data to supply the electrical load/s, via the switching component, with electrical power.

The switching component may be configured into an updated switching configuration, wherein the updated switching configuration differs from the switching configuration by a change in the number or type of electrical loads connected to the electrical drives.

The switching component may be configured into an updated switching configuration, wherein the updated switching configuration differs from the switching configuration by a change in the number of electrical drives connected to the electrical loads.

The electrical loads may include one or more of a propulsion load.

The electrical loads may include one or more motors or motoring loads.

The electrical loads may include a low voltage network.

The electrical loads may include one or more resistive loads.

The electrical loads may include one or more inductive loads.

The electrical loads may include one or more heaters.

The electrical loads may include one or more actuation loads for an aileron or flight control surface.

In a third aspect there is provided a method for controlling an electrical drive system, the electrical drive system comprising one or more electrical drives, one or more electrical loads, and a switching component configured to connect the one or more electrical drives to the one or more electrical loads in a switching configuration. The method comprises receiving switching data indicative of the switching configuration, analyzing the switching data to determine control data for at least one of the electrical drives, and outputting the control data to the at least one electrical drive. The at least one electrical drive is configured to use the first control data to supply the electrical load/s, via the switching component, with electrical power.

The electrical drive system of the second aspect or the method of the fourth aspect may comprise any of the features of the examples described with respect to the first aspect, including features derived from functional steps.

BRIEF DESCRIPTION OF THE DRAWINGS

Various examples will now be described with reference to the accompanying drawings in which:

The FIGURE schematically shows an electrical drive system for an aircraft, including electrical drives, a controller, a switching component, and electrical loads.

DETAILED DESCRIPTION

With reference to the FIGURE, an electrical drive system 100 includes input power terminals 101, 103, a plurality of electrical drives 106, 126, 136, a plurality of filters 107, 127, 137, a switching component 109, a first load 111, a second load 113 and a controller 115.

The electrical drive system 100 may operate as a multi-channel drive system. This means that the electrical drive system 100 may have a plurality of "channels" or electrical drives operable in parallel.

The input power terminals 101, 103 are configured to receive electrical power. The received electrical power may be direct current (DC) electrical power. The input power terminals 101, 103 are connected to each of the electrical drives 106, 126, 136 by electrical conductors. The electrical conductors transfer the received electrical power at the power terminals 101, 103, to each of the electrical drives 106, 126, 136.

Each of the electrical drives 106, 126, 136 converts received electrical power to an output electrical power having different characteristics to the received electrical power. In this example, the electrical drives 106, 126, 136 are configured to convert received DC electrical power from the power terminals 101, 103 to provide an output of 3 phase alternating current (AC) electrical power. In this manner, the electrical drives 106, 126, 136 are three phase DC-AC converters.

Each of the electrical drives 106, 126, 136 is respectively connected to one of the filters 107, 127, 137, such that the power output from the electrical drive 106, 126, 136 is provided to the respective filter 107, 127, 137.

Although this example discloses filters 107, 127, 137, it is not necessary for the filters 107, 127, 137 to form part of the electrical drive system 100. Alternatively, the filters 107, 127, 137 may not always be active, as they may be bypassed or turned off.

The filters 107, 127, 137 are connected to the switching component 109 on an input side of the switching component 109. The switching component 109 is further connected to the first load 111 and the second load 113 on an output side of the switching component 109.

The switching component 109 is configured to operably connect any of the electrical drives 106, 126, 136 (via the filters 107, 127, 137) to the first electrical load 111 and/or the second electrical load 113. The configuration in which the switching component 109 connects the electrical drives 106, 126, 136 (via the filters 107, 127, 137) to the electrical loads 111, 113 is referred to as a switching configuration. The switching configuration thus determines or is indicative of power transfer from the electrical drives 106, 126, 136 to the electrical loads 111, 113.

The controller 115 comprises a processing module 116 and an output module 117. The controller 115 is connected to the switching component 109 via a receiving data line 118. The receiving data line 118 provides the controller 115 with switching data from the switching component 109.

The receiving data line 118 may not be directly connected to the switching component 109, and may instead be connected to any part of the electrical drive system 100 or any other external system that can provide the controller 115 with the switching data. The switching data is discussed further below.

The controller 115 is connected to the electrical drives 106, 126, 136 via data lines 105, 125, 135.

In a first operating example, it is desired that the first electrical load 111, which in this example is a high power motor, receives electrical power, and that power is not provided to any other electrical loads.

A supervisory switching controller (not shown) provides instructions to the switching component 109 to configure the switching component 109 into a switching configuration. In the switching configuration, the first electrical load 111 is connected to an output side of the switching component 109, and the second electrical load 113 is disconnected from the output side of the switching component 109. Furthermore, in the switching configuration, a first electrical drive 106 and a second electrical drive 126 are connected to an input side of the switching component 109, via a first filter 107 and a second filter 127 respectively.

As such, in the switching configuration, the first electrical drive 106 and the second electrical drive 126 are able to transfer electrical power, via the first filter 107 and second filter 127 respectively, to the motor (first electrical load 111).

The supervisory switching controller also provides the first electrical drive 106 and the second electrical drive 126 with a speed set point for the first electrical load 111, and reference speed data from the first electrical load 111. The first electrical drive 106 and the second electrical drive 126 each use the speed set point and the reference speed data to independently implement speed and torque control loops to achieve the desired speed set point. The first and second filters 107, 127 provide filtration of the electrical power output from the electrical drives 106, 126 for improved power quality. In this manner, electrical power is transferred from the electrical drives 106, 126 to the first electrical load 111, and the second electrical load 113 remains disconnected.

As the switching component 109 is configured into the switching configuration, the receiving data line 118 sends switching data to the controller 115. The switching data is indicative of the switching configuration.

The processing module 116 of the controller 115 receives the switching data, and analyzes the switching data to determine control data for the first and second electrical drives 106, 126.

When the processing module 116 analyzes the switching data it is able to determine that the first electrical load 111 is the only connected load, and that two electrical drives are providing power.

The processing module 116 is also able to determine by analyzing the switching data that the first electrical load 111 is a high power motor. Based on this analysis, the processing module 116 determines that a first set A of proportional, integral and derivative (PID) data values should be implemented in the control loops used by the electrical drives 106, 126, in order for the electrical drives 106, 126 to achieve maximum power efficiency.

The first set A of PID values is optimized for an electrical drive providing power to a motor in a dual channel mode.

In this example, the control data comprises instructions to the first and second electrical drives 106, 126 to use the first set A of PID data values in the control loops. The first set A of data values are stored locally in the electrical drives 106, 126.

After the processing module 116 has determined the control data, the output module 117 outputs the control data to the first electrical drive 106, via a first data line 105, and to the second electrical drive 126, via a second data line 125.

The first electrical drive 106 receives the control data via the first data line 105. Because in this example the control data is a set of instructions, the first electrical drive 106 executes the instructions contained within the control data. The instructions cause the first electrical drive 106 to load the first set A of PID values which are stored locally within the first electrical drive 106. Once loaded, the first electrical drive 106 implements the first set A of PID values into its control loops. Because the first set A of the PID values may be more optimized for providing power to the high power motor (first electrical load 111), the control performance of the first electrical drive 106 may be improved.

At the same time, the second electrical drive 126 receives the control data via the second data line 125. The second electrical drive 126 executes the instructions contained within the control data. The instructions cause the second electrical drive 126 to load the first set A of PID values which are stored locally within the second electrical drive 126. Once loaded, the second electrical drive 126 implements the first set A of PID values into its control loops. Because the first set A of the PID values may be more optimized for providing power to the high power motor, the control performance of the second electrical drive 126 may be improved.

The operation of the high power motor continues, with the supervisory switching controller providing the speed set point to the first and second electrical drives 106, 126.

It is then desired for the high power motor it operate in a low power mode, and as a result only one electrical drive is required to power the motor. The supervisory switching controller provides instructions to the switching component 109 to configure the switching component 109 into an updated switching configuration. In the updated switching configuration, the second electrical drive 126 is disconnected from the input side of the switching component 109. As such, only the first electrical drive 106 is able to transfer power to the motor.

As the switching component 109 is configured into the updated switching configuration, the receiving data line 118 transfers switching data to the controller 115. The processing module 116 analyzes the switching data to determine control data for the first electrical drive 106.

When the processing module 116 analyzes the switching data it is able to determine that the motor is the only connected load, and that one electrical drive is providing power. The processing module 116 is also able to determine that the motor is operating in a low power mode. Based on this analysis, the processing module 116 determines that a second set B of PID data values should be implemented in the control loop used by the first electrical drive 106, in order for the first electrical drive 106 to achieve maximum power efficiency.

The second set B of PID values are optimized for an electrical drive providing power to a motor in a single channel mode.

After the processing module 116 has determined the control data, the output module 117 outputs the control data to the first electrical drive 106 via the first data line 105.

The first electrical drive 106 receives the control data via the first data line 105. The control data causes the first electrical drive 106 to load the second set B of PID values which are stored locally within the first electrical drive 106. Once loaded, the first electrical drive 106 implements the second set B of PID values into its control loops.

In this example, the first set A of PID values is optimized for an electrical drive operating in a dual channel mode, whereas the second set B of PID values is optimized for an electrical drive operating in a single channel mode. Because the second set B of the PID values is more optimized for providing power to the low power motor (first electrical load 111) in a single channel mode, the control performance of the first electrical drive 106 is improved by using the second set B of PID values.

In an alternative example, it is desired that the second electrical load 113 is turned on and that the motor continues to operate in a high power mode. As a result, the first and second electrical drives 106, 126 are to remain connected, and a third electrical drive 136 should also be connected to provide the additional power required for the second electrical load 113.

In this example, the second electrical load 113 is a heater that has a desired set point provided by the supervisory switching controller. As such, the supervisory switching controller provides the first and second electrical drives 106, 126 with speed set points for the motor, and the third electrical drive 136 with a temperature set point for the second electrical load 113.

The supervisory switching controller provides instructions to the switching component 109 to configure the switching component 109 into an updated switching configuration. In the updated switching configuration, the first, second and third electrical drives 106, 126, 136 are connected to the input side of the switching component 109, and the first and second electrical loads 111, 113 are connected to the output side of the switching component 109. In the updated switching configuration, the first and second electrical drives 106, 126 are able to transfer power to the motor, and the third electrical drive 136 is able to transfer power to the second electrical load 113.

As the switching component 109 is configured into the updated switching configuration, the receiving data line 118 transfers switching data to the controller 115. The processing module 116 analyzes the switching data to determine control data for the first electrical drive 106, the second electrical drive 126 and the third electrical drive 136.

When the processing module 116 analyzes the switching data it is able to determine that the motor is the first electrical load, and that two electrical drives are providing power to the motor. The processing module 116 is also able to determine that the motor is operating in a high power mode. Furthermore, the processing module 116 is able to determine that the heater is the second electrical load 113, and that one electrical drive is providing power to the heater. Based on this analysis, the processing module 116 determines that the first set A of PID data values should be implemented in the control loop used by the first and second electrical drives 106, 126, and that a third set C of PID data values should be implemented in the control loop used by the third electrical drive 136, in order for the first, second and third electrical drives 106, 126, 136 to each achieve maximum power efficiency. In this manner, the processing module 116 determines individual control data for each of the electrical drives 106, 126, 136.

The third set C of PID values are optimized for an electrical drive providing power to a heater.

After the processing module 116 has determined the individual control data for each of the electrical drives 106, 126, 136, the output module 117 outputs the individual control data for the first electrical drive 106 via the first data line 105, the individual control data for the second electrical drive 126 via the second data line 125, and the individual control data for the third electrical drive 136 via a third data line 135.

The first electrical drive 106 receives the individual control data which causes the first electrical drive 106 to load the first set A of PID values which are stored locally within the first electrical drive 106. Once loaded, the first electrical drive 106 implements the first set A of PID values into its control loops.

The second electrical drive 126 receives the individual control data which causes the second electrical drive 126 to load the first set A of PID values which are stored locally within the second electrical drive 126. Once loaded, the second electrical drive 126 implements the first set A of PID values into its control loops.

The third electrical drive 136 receives the individual control data which causes the third electrical drive 136 to load the third set C of PID values which are stored locally within the third electrical drive 136. Once loaded, the third electrical drive 136 implements the third set C of PID values into its control loops.

In this example, because the first set A of PID values are optimized for providing power to the high power motor in a dual channel mode, and because the third set C of PID values are optimized for providing power to the second electrical load 113, the control performance of the first, second and third electrical drives 106, 126, 136 is improved.

Although this disclosure gives three examples of electrical loads, electrical drives and PID values, it is to be understand that various combinations of electrical loads, electrical drives and PID values may be used in order to provide a more efficient electrical drive system, without departing from the scope of the invention. There may be different numbers of electrical drives, filters and/or electrical loads from what is shown in the figures.

For example, the electrical loads may include one or more of a propulsion load, a motor or motoring loads, a low voltage network, resistive loads, inductive loads, heaters, or an actuation load/s for an aileron or flight control surface.

It is to be understood that the supervisory controller may be an isolated or independent component, or may be part of a higher level controller. Additionally, the supervisory controller may partially or completely include the functionality and features of the controller 115.

In an alternative example, the processing module 116 may analyze the switching data to determine the control data. In this example, the control data may be a set of control parameters for use by one of the electrical drives 106, 126, 136 in a non-linear control method.

In an alternative example, the processing module 116 may analyze the switching data to determine the control data. In this example, the control data may be a set of instructions for one of the electrical drives 106, 126, 136 to use a set of control parameters which are stored locally within the electrical drives 106, 126, 136. The control parameters may be for a non-linear or other control method.

Various aspects of the apparatus and methods disclosed in the various embodiments may be used alone, in combination, or in a variety of arrangements not specifically discussed in the embodiments described in the foregoing, and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A controller for an electrical drive system, the electrical drive system comprising a plurality of electrical drives configured to convert received electrical power having a first set of characteristics to electrical power having a second set of characteristics, a plurality of electrical loads, and a switching component configured to connect the plurality of electrical drives to the plurality of electrical loads in a switching configuration, the controller comprising:

- a processing device configured to receive switching data indicative of the switching configuration and analyze the switching data to determine a set of proportional, integral, and derivative data values for the plurality of electrical drives; and
- an output module configured to output the set of proportional, integral, and derivative data values to the plurality of electrical drives;

wherein the electrical drives are configured to use the set of proportional, integral, and derivative data values to supply the plurality of electrical loads, via the switching component, with electrical power having the second set of characteristics.

2. The controller of claim 1, wherein:

in response to a change in the switching configuration, the processing device is further configured to analyze the switching data to determine an updated set of proportional, integral, and derivative data values for at least one of the plurality of electrical drives; and the output module is configured to output the updated set of proportional, integral, and derivative data values to the at least one of the plurality of electrical drives.

3. The controller of claim 2, wherein a first number of electrical drives is connected to a first number of electrical loads in the switching configuration and a different number of electrical drives is connected to a different number of electrical loads in an updated switching configuration such that the switching data is indicative of a change in a number of electrical loads and/or a change in a number of electrical drives.

4. The controller of claim 3, wherein the switching data is further indicative of a change in an electrical characteristic of the plurality of electrical loads and/or the plurality of electrical drives.

5. The controller of claim 4, wherein the change in the electrical characteristic includes a change in a level of power output from at least one of the plurality of electrical drives.

6. The controller of claim 4, wherein the change in the electrical characteristic includes a change in an inductance and/or a resistance of at least one of the plurality of electrical loads.

7. The controller of claim 2, wherein the set of proportional, integral, and derivative data values and/or the updated set of proportional, integral, and derivative data values comprises instructions to the plurality of electrical drives to use a set of control parameters that are stored locally in the plurality of electrical drives.

8. The controller of claim 7, wherein the set of proportional, integral, and derivative data values is implemented in control loops of the plurality of electrical loads.

9. The controller of claim 1, wherein:

the processing device is further configured to analyze the switching data to determine individual sets of proportional, integral, and derivative data values for each of the plurality of electrical drives; and the output module is further configured to output the individual sets of proportional, integral, and derivative data values to each of the plurality of electrical drives.

10. The controller of claim 9, wherein, in response to a change in the switching configuration:

the processing device is further configured to analyze the switching data to determine updated individual sets of proportional, integral, and derivative data values; and the output module is further configured to output the updated individual sets of proportional, integral, and derivative data values to each of the plurality of electrical drives.

11. The controller of claim 1, wherein the processing device is configured to:

determine a first set of control data responsive to first switching data indicative of a first switching configuration; and determine a second set of control data responsive to second switching data indicative of a second switching configuration.

12. An electrical drive system for an aircraft, the electrical drive system comprising:

a plurality of electrical drives configured to convert received electrical power having a first set of characteristics to electrical power having a second set of characteristics;

a plurality of electrical loads;

a switching component configured to connect the plurality of electrical drives to the plurality of electrical loads in a switching configuration; and a controller configured to:

receive switching data indicative of the switching configuration and analyze the switching data to determine a set of proportional, integral, and derivative data values for the plurality of electrical drives; and output the set of proportional, integral, and derivative data values to the plurality of electrical drives;

wherein the electrical drives are configured to use the set of proportional, integral, and derivative data values to supply the plurality of electrical loads, via the switching component, with electrical power having the second set of characteristics.

13. The electrical drive system of claim 12, wherein:

the switching component is configured to switch into an updated switching configuration; and the updated switching configuration differs from the switching configuration by a change in a number or a type of electrical loads connected to the plurality of electrical drives.

14. The electrical drive system of claim 12, wherein:

the switching component is configured to switch into an updated switching configuration; and the updated switching configuration differs from the switching configuration by a change in a number of electrical drives connected to the plurality of electrical loads.

15. The electrical drive system of claim 12, wherein the electrical loads include one or more of: a propulsion load, a motor load, a low voltage network, a resistive load, or an actuation load for an aileron or flight control surface.

16. The electrical drive system of claim 12, wherein the controller is further configured to:

determine a first set of control data responsive to first switching data indicative of a first switching configuration; and determine a second set of control data responsive to second switching data indicative of a second switching configuration.

17. The electrical drive system of claim 12, wherein the set of proportional, integral, and derivative data values is implemented in control loops of the plurality of electrical loads.

18. A method for controlling an electrical drive system, the electrical drive system comprising a plurality of electrical drives configured to convert received electrical power having a first set of characteristics to electrical power having a second set of characteristics, a plurality of electrical loads, and a switching component configured to connect the plurality of electrical drives to the plurality of electrical loads in a switching configuration, the method comprising:

receiving switching data indicative of the switching configuration;

analyzing the switching data to determine a set of proportional, integral, and derivative data values for the plurality of electrical drives; and outputting the set of proportional, integral, and derivative data values to the plurality of electrical drives;

wherein the electrical drives are configured to use the set of proportional, integral, and derivative data values to supply the plurality of electrical loads, via the switching component, with electrical power having the second set of characteristics.

19. The method of claim 18, further comprising:

determining a first set of control data responsive to first switching data indicative of a first switching configuration; and determining a second set of control data responsive to second switching data indicative of a second switching configuration.

20. The method of claim 18, further comprising:

implementing the set of proportional, integral, and derivative data values in control loops of the plurality of electrical loads.

* * * * *